(12) United States Patent
Bradski

(10) Patent No.: US 6,798,429 B2
(45) Date of Patent: Sep. 28, 2004

(54) INTUITIVE MOBILE DEVICE INTERFACE TO VIRTUAL SPACES

(75) Inventor: Gary R. Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 09/820,478

(22) Filed: Mar. 29, 2001

(65) Prior Publication Data

US 2002/0140666 A1 Oct. 3, 2002

(51) Int. Cl.$^7$ ................................................. G09G 5/00
(52) U.S. Cl. ..................... 346/684; 345/156; 345/863
(58) Field of Search ............................. 345/156, 157, 345/158, 162, 169, 173, 649, 659, 672, 684, 685, 688, 863; 702/150, 151, 152, 153, 154; 368/224, 225; 463/30, 38

(56) References Cited

U.S. PATENT DOCUMENTS

| | | | | |
|---|---|---|---|---|
| 5,602,566 A | * | 2/1997 | Motosyuku et al. | 345/684 |
| 6,005,548 A | * | 12/1999 | Latypov et al. | 345/156 |
| 6,115,025 A | * | 9/2000 | Buxton et al. | 345/659 |
| 6,137,468 A | * | 10/2000 | Martinez et al. | 345/649 |
| 6,201,554 B1 | * | 3/2001 | Lands | 345/156 |
| 6,288,704 B1 | * | 9/2001 | Flack et al. | 345/684 |
| 6,340,957 B1 | * | 1/2002 | Adler et al. | 345/1.3 |
| 6,347,290 B1 | * | 2/2002 | Bartlett | 702/150 |
| 6,400,376 B1 | * | 6/2002 | Singh et al. | 345/156 |
| 6,466,198 B1 | * | 10/2002 | Feinstein | 345/158 |
| 6,509,907 B1 | * | 1/2003 | Kuwabara | 345/684 |
| 6,556,185 B2 | * | 4/2003 | Rekimoto | 345/157 |
| 6,567,101 B1 | * | 5/2003 | Thomas | 345/649 |
| 6,597,384 B1 | * | 7/2003 | Harrison | 345/169 |
| 6,603,420 B1 | * | 8/2003 | Lu | 345/158 |

OTHER PUBLICATIONS

Hinckley, Pierce, Sinclair, Horvitz, Microsoft Research, Redmond, WA, "Sensing Techniques for Mobile Interaction," UIST '00, Nov. 5–8, 2000, pp. 91–100.

* cited by examiner

*Primary Examiner*—Steven Saras
*Assistant Examiner*—Paul A. Bell
(74) *Attorney, Agent, or Firm*—Blakely, Sokoloff, Taylor & Zafman LLP

(57) ABSTRACT

The present invention relates to a simple to use intuitive interface for mobile devices and, in particular, to a method and apparatus to permit the motion of a mobile device to serve as an input to the mobile device. In various embodiments, the relative and/or absolute motion, distance and/or acceleration for instance, of the mobile device may be mapped to correspond to particular commands. In one embodiment, this permits the display screen of the mobile device to serve as a virtual window to view a large data set by modifying the view of the displayed data according to the motion of the mobile device. In another embodiment, the present invention allows the user to navigate a virtual space, displayed on the screen of the mobile device, by the motion of the mobile device in real space. Additionally, the user may also control the different displayed views of virtual objects by the relative and/or absolute motion of the mobile device.

33 Claims, 11 Drawing Sheets

|   |   |   |   |   |   |   |   |   |
|---|---|---|---|---|---|---|---|---|
| A | B | C | D | E | F | G | H | I |
| J | K | L | M | N | O | P | Q | R |
| S | T | U | V | W | X | Y | Z | 0 |
| 1 | 2 | 3 | 4 | 5 | 6 | 7 | 8 | 9 |
| a | b | c | d | e | f | g | h | i |
| j | k | l | m | n | o | p | q | r |
| s | t | u | v | w | x | y | z | @ |

FIG. 1A

INTUITIVE MOBILE DEVICE INTERFACE TO VIRTUAL SPACES

FIELD

The present invention relates generally to an intuitive mobile device interface and more particularly to a method and apparatus to enable the relative and/or absolute motion of a mobile device to serve as a one-dimensional or multi-dimensional input to the mobile device.

BACKGROUND OF THE INVENTION

As the demand for information and connectivity has grown, mobile computing devices have been increasingly deployed to provide convenient access to information. The term mobile computing devices, or mobile devices, as used herein, includes mobile phones, beepers, hand held computers and/or devices, personal digital assistants, and any other type of mobile user electronic device with a display area of some form.

The small size and lightweight of mobile computing devices gives the user a sense of intimacy and control. However, these same advantages require that the screen size of mobile devices be small so that they can be hand held. This leads to cumbersome user input interfaces since conventional interfaces, such as keyboards and mouse devices, usually hinder mobility.

Typically, users are limited to using touch screens, stencils, or buttons as input interfaces to mobile devices. Such input interfaces are cumbersome requiring the use of both hands, one to hold the mobile device and the other to enter data.

Another difficulty with the small display screens of mobile devices is controlling the view and/or movement of representations of data and/or objects, also referred to as the virtual space. Indicating the desired movement in the virtual space may be cumbersome and slow using a stylus or touch screen. For example, indicating the desired motion in a three-dimensional virtual space may be awkward using two-dimensional interfaces such as stylus or touch screens. Moreover, controlling movement in a virtual space by using a stylus or touch screen may conflict with other modes of operation of the input interface.

The small screen sizes and cumbersome interfaces limit the display of larger data sets. Some of these data sets may include two-dimensional data, such as text, three-dimensional data, such visual objects, or four-dimensional data, such as visual objects that change over time. The user may be limited to viewing small documents or objects or small parts of a large document or objects.

BRIEF DESCRIPTION OF THE DRAWINGS

FIG. 1A shows a sample of a two-dimensional data file.

DETAILED DESCRIPTION OF THE INVENTION

The present invention provides an intuitive motion-based and/or position-based interface to provide a one-dimensional and/or multi-dimensional form of input. In one application, the present invention enables displaying large data sets on a small screen by using the screen as a virtual window into a larger space. In another application, the movement of the mobile device in real space allows a user to control the multi-dimensional movements and views of virtual objects and/or virtual space.

While conventional input techniques are hindered by their two-dimensional approach, the present invention permits input in multi-dimensional space by detecting the user's physical movement of the mobile device and mapping said movements to display-altering commands to modify the view of the displayed data set, virtual object, and/or virtual space. Thus, a user's movement of a mobile device, in one, two, three, and/or more degrees of freedom, may be correlated to the movement of a data set, visual objects, and/or virtual space in one, two, three, or more dimensions. That is, movements or gestures in many degrees of freedom may be translated to many dimensions in a data set and/or operations over the data set. For purposes of this description, the term "gesture" is defined as limb and/or bodily motion intended to convey information.

Figure 1B:
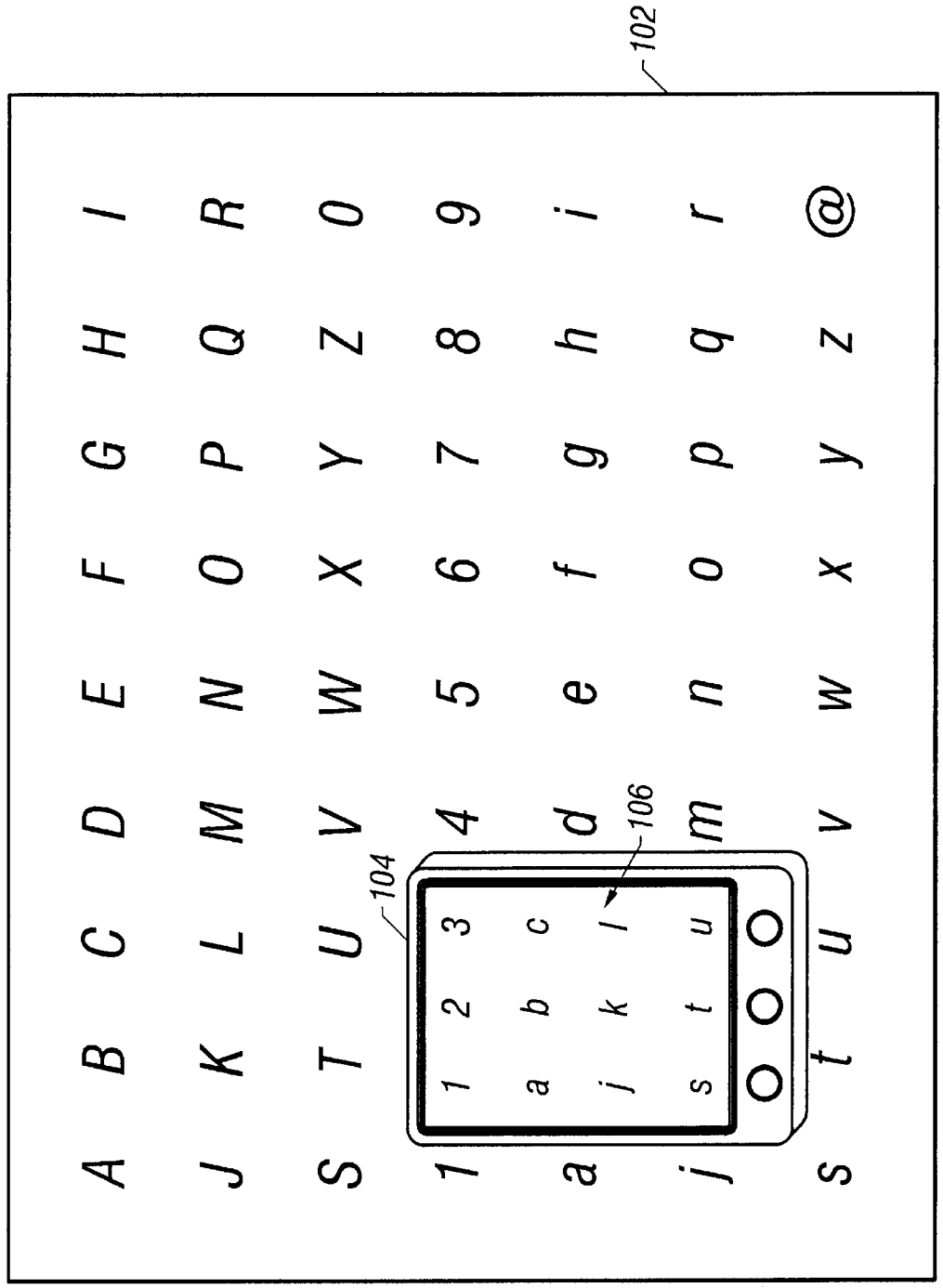
FIG. 1B illustrates a first view of the two-dimensional data file in FIG. 1A as seen on a small screen of a computing device of the present invention with the device at a first position.

FIG. 1A illustrates a two-dimensional text data file 102. In a first embodiment of the present invention, FIG. 1B illustrates how the display screen of a mobile computing device 104 may serve as a virtual window to the larger data file 102 and display a portion of said data file 106 with the mobile device at a first position.

According to one implementation, moving the mobile device left, right, up, or down may result in corresponding movements in the view of the document, data set, and/or visual object in the virtual space.

Figure 1C:
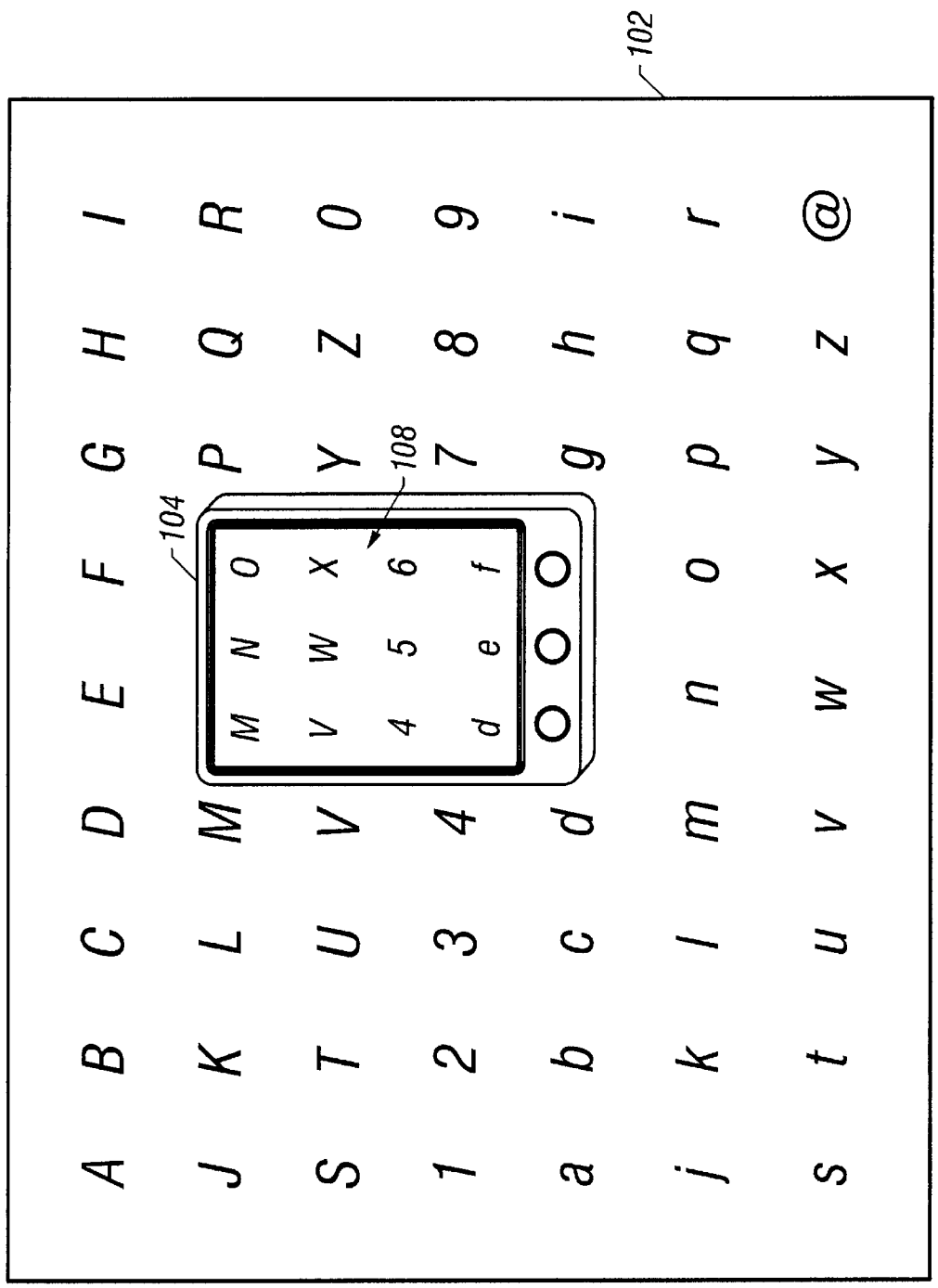
FIG. 1C illustrates a second view of the two-dimensional data file in FIG. 1A as seen on a small screen of a computing device of the present invention having physically moved the device to a second position.
Figure 1D:
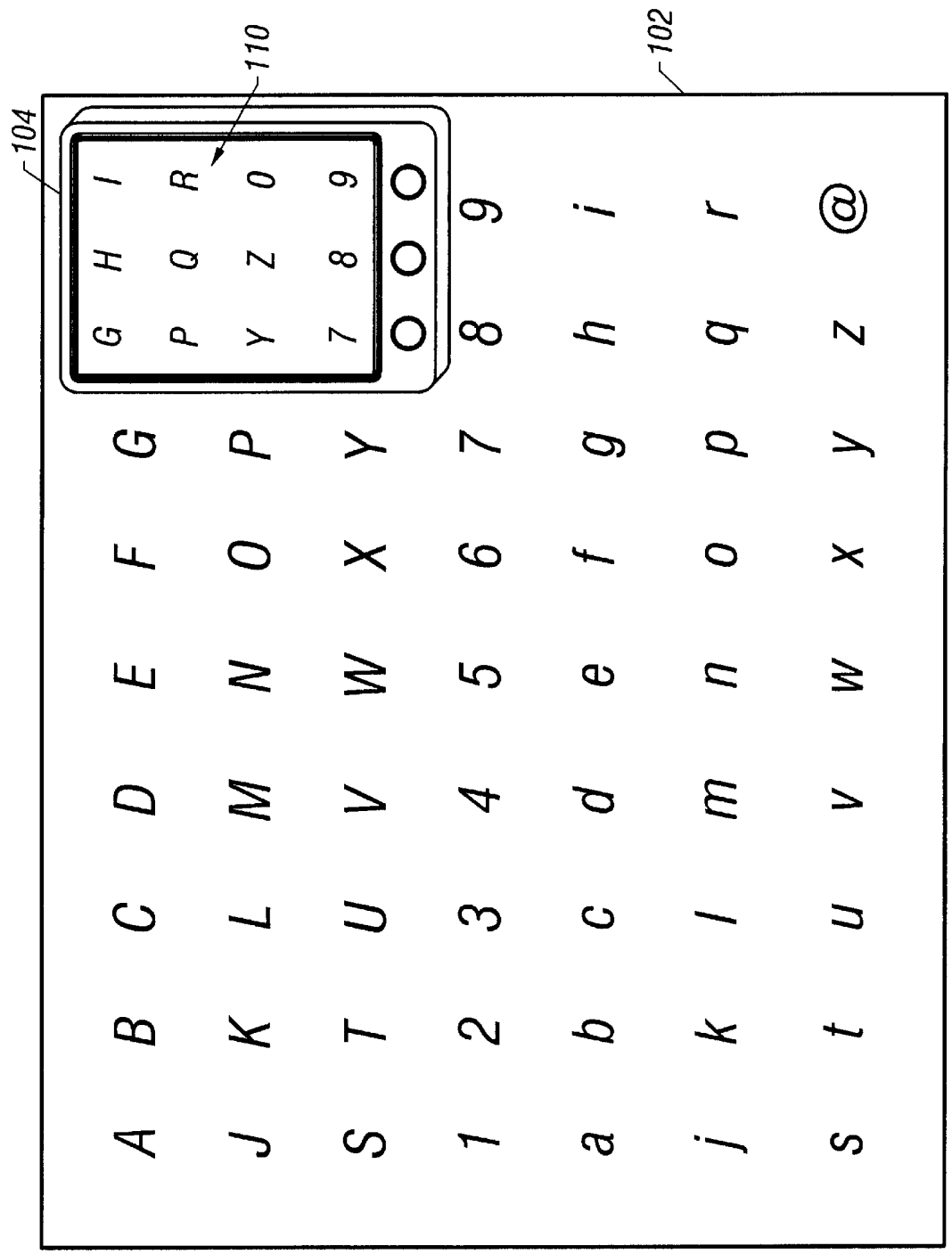
FIG. 1D illustrates a third view of the two-dimensional data file in FIG. 1A as seen on a small screen of a computing device of the present invention having physically moved the device to a third position.

FIG. 1C illustrates the portion of the data 108 from the larger data file 102 of FIG. 1A that may be displayed on the screen of the mobile device 104 when the mobile device 104 is physically moved to a second position. FIG. 1D illustrates yet a third view of the data on the display screen 110 of the mobile device 104 when the mobile device 104 is moved to a third position.

In various embodiments, the motions or gestures illustrated in FIGS. 1A through 1C may be along a two-dimensional plane or three-dimensional space.

Figure 1E:
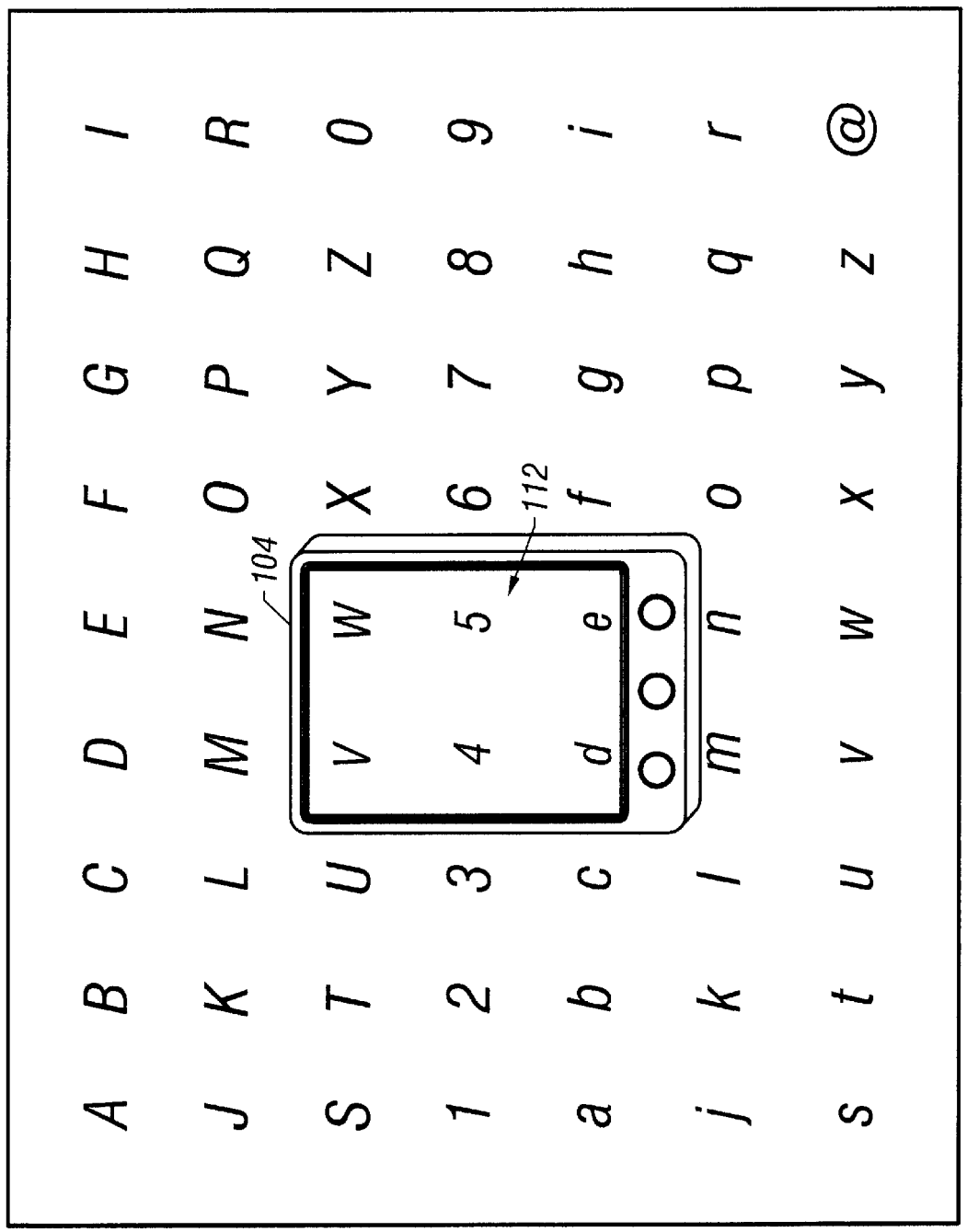
FIG. 1E illustrates a third view of the two-dimensional data file in FIG. 1A as seen on a small screen of a computing device without changing the size of the data displayed.

Note that the mobile device may display a reduced, unchanged, or enlarged version of the larger virtual space containing the data set. For instance, in FIG. 1E, the data displayed on the screen 112 of the mobile device 104 is larger than that displayed in FIGS. 1B, 1C, and 1D.

Figure 2A:
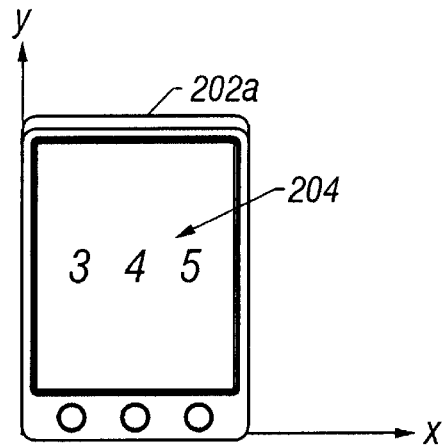
FIG. 2 illustrates how, in one embodiment of the present invention, rotation of a mobile device about a substantially horizontal axis may result in left or right scrolling of the data displayed.
Figure 2B:
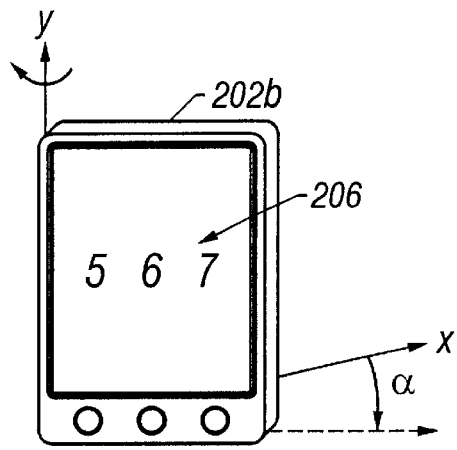
Figure 2C:
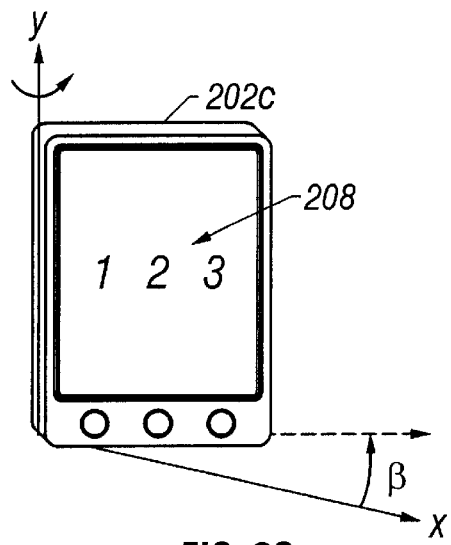

FIGS. 2A, 2B, and 2C illustrate another embodiment of the present invention. When the user desires to scroll right or left to view different portions of a large data set, this may be accomplished by rotating the device about a substantially vertical axis. FIG. 2A illustrates a mobile device 202a at a first position displaying a portion of a data set 204 comprising a number list in increasing order. FIG. 2B illustrates how the data set in FIG. 2A may scroll right, thereby displaying higher numbers in the list 206, when the mobile device 202b is placed at a second position. This may be achieved by rotating the device clockwise about its vertical axis. Similarly, FIG. 2C illustrates how the data set in FIG. 2A may scroll left, displaying lower numbers in the list 208, by placing the mobile device 202c at a third position. This may be accomplished by rotating the mobile device counter-clockwise about its vertical axis.

Figure 3A:
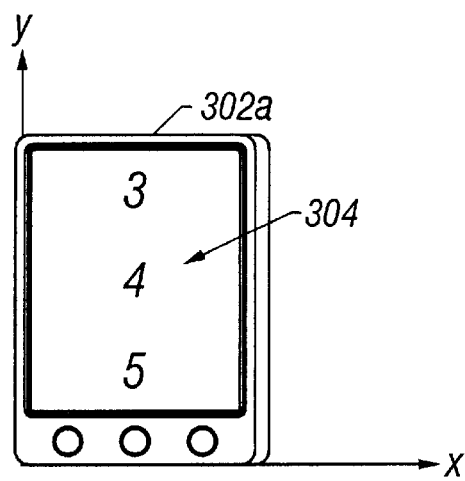
FIG. 3 illustrates how, in one embodiment of the present invention, rotation of a mobile device about a substantially vertical axis may result in upward or downward scrolling of the data displayed.
Figure 3B:
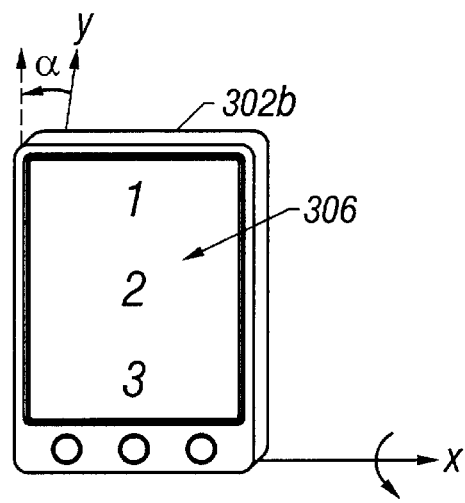
Figure 3C:
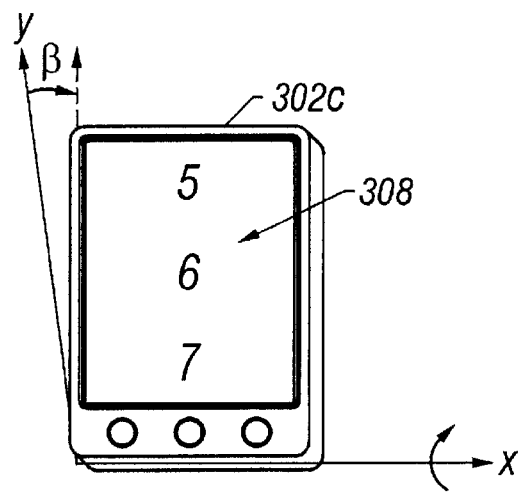

FIGS. 3A, 3B, and 3C illustrate yet another embodiment of the present invention where a user may scroll up or down to view a large data set. When a user desires to scroll up or down to view a large data set, this may be accomplished by rotating the device about a substantially horizontal axis. FIG. 3A illustrates a mobile device 302a at a first position displaying a portion of a data set 304 comprising a number list in increasing order. FIG. 3B illustrates how the data set in FIG. 3A may scroll up, displaying lower numbers in the list 306, when the mobile device 302b is moved to from the first to a second position. This may be result when the top edge of the device is tilted forward or rotated about its horizontal axis. FIG. 3C illustrates how the data set in FIG. 3A may scroll down, displaying higher numbers in the list 308, when the mobile device 302c is moved from the first position to a third position. This may be accomplished by tilting the top edge of the device backwards, thereby rotating the device about its horizontal axis.

The motions of the mobile devices describe with reference to FIGS. 2A–C and 3A–C may be relative, as measured versus on a prior position, or absolute, as measured versus some fixed reference(s).

In various embodiments, the scrolling functions described with reference FIGS. 2A–C and 3A–C may be activated or deactivated by the user through a gating mechanism or other means. Thus, the view of the data set would not change unless the user activated the gesture-based or motion-based feature.

The angle and/or speed of rotation may provide additional information. For example, in one embodiment, the angle of rotation determines the speed at which the data scrolls on the display screen. For example, a greater angle may correspond to faster scrolling of the data set.

Additionally, it must be understood that the present invention may be practiced by utilizing different axes and motions. The effect that a gesture or motion has on the data or virtual environment may be configured according to the desired implementation. In one embodiment, the user may configure or map particular gestures or motions to a desired display-controlling command.

The intuitive interface of the present invention may also be employed to display and move virtual objects, or other data representations, in a multi-dimensional virtual space.

Figure 4:
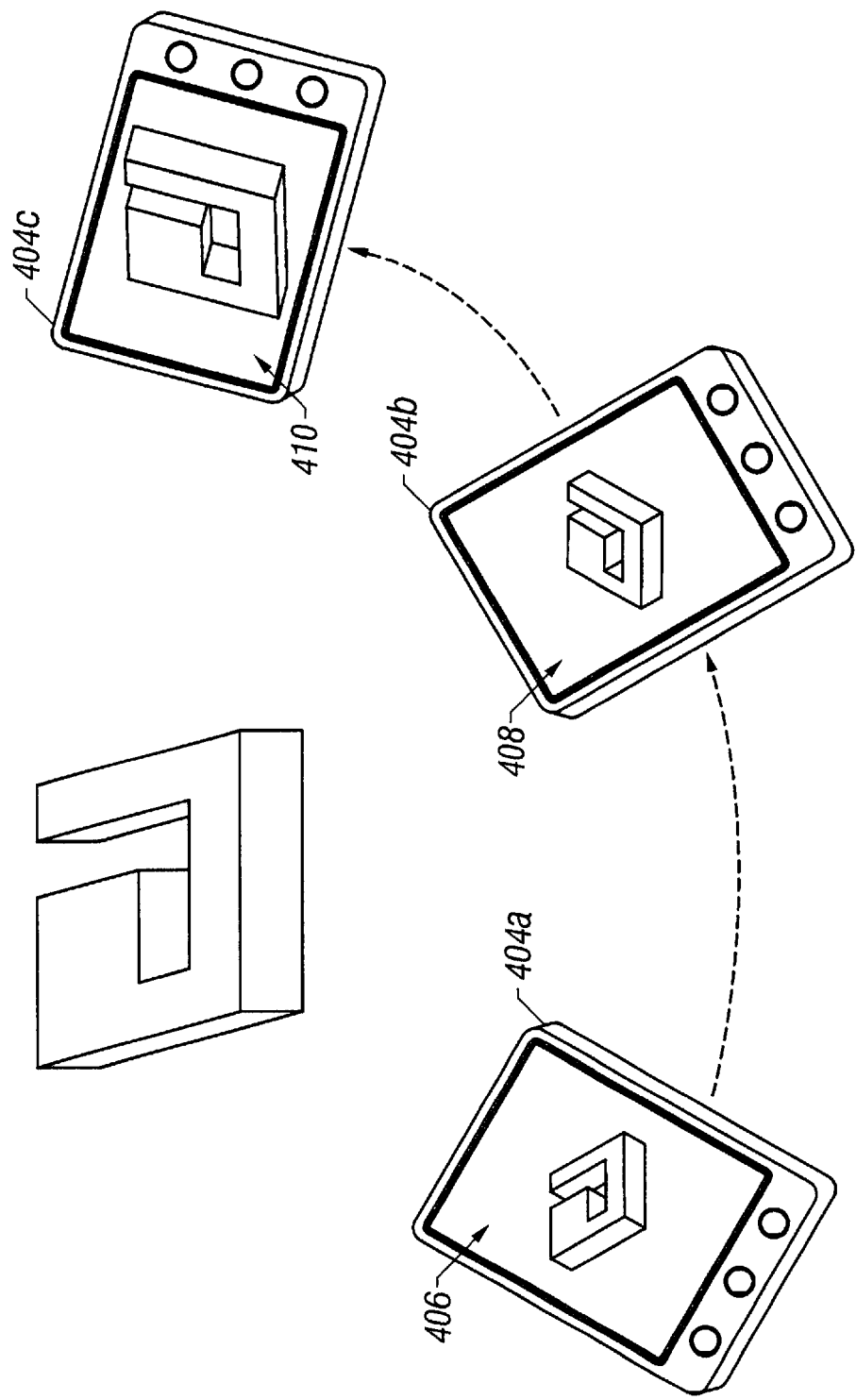
FIG. 4 illustrates the operation of one embodiment of the present invention showing how moving a mobile device in multi-dimensional space causes a different view of a virtual object to be displayed on the screen.

FIG. 4 illustrates how, in one implementation of the present invention, a three-dimensional virtual object may be displayed on the screen of a mobile device. With the mobile device 404a at a first position, the screen may display a first view of a virtual object 406. Physically moving the mobile device 404b to a second position may cause a second view of the virtual object 408 to be displayed. The view displayed when the mobile device 404b is at a second position may correspond to the view of the object which may be observed if the user had changed his point of view. Further moving the mobile device 404c to a third position may cause a third view of the virtual object 410 to be displayed.

Figure 5:
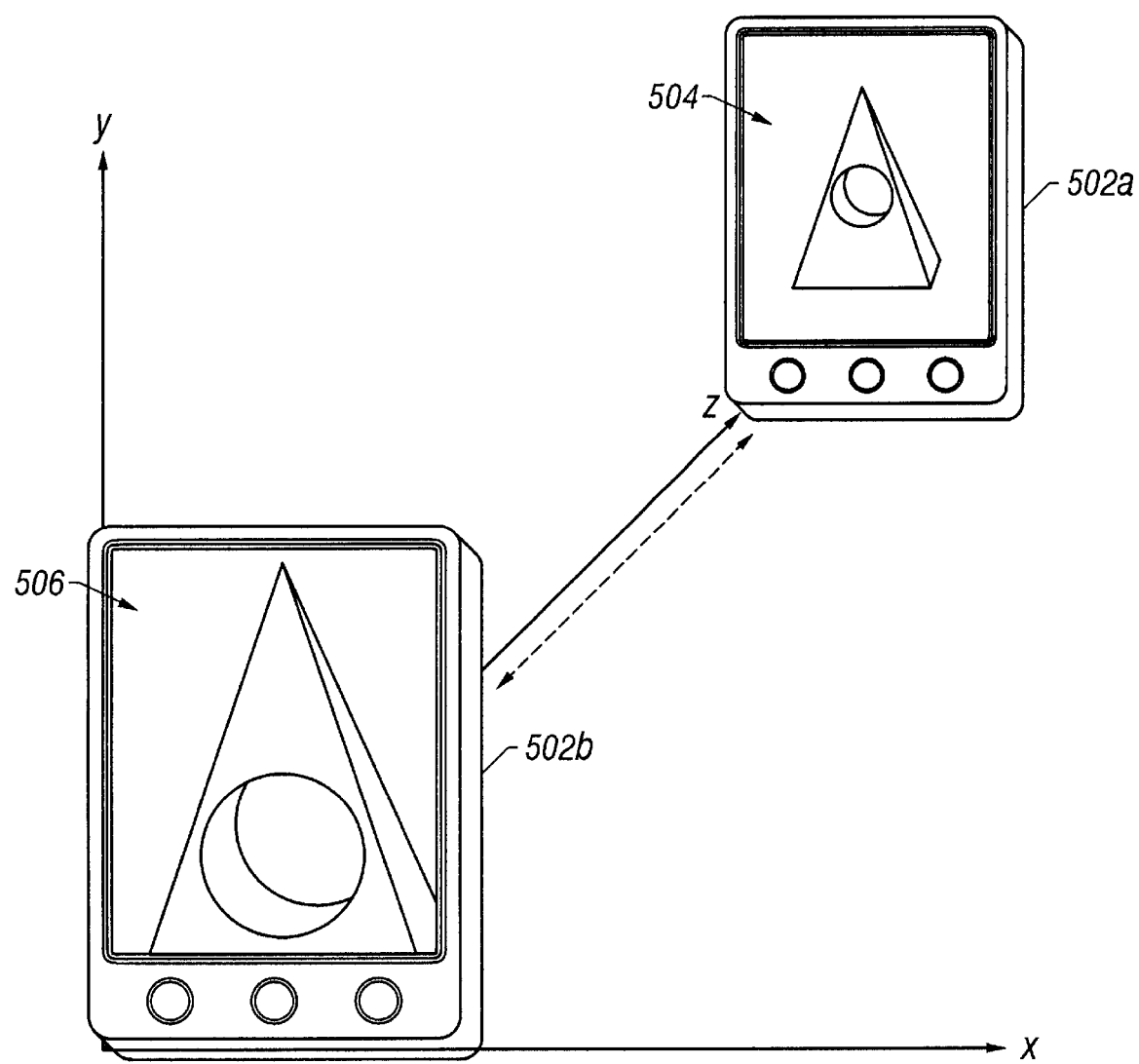
FIG. 5 illustrates how, in one embodiment of the present invention, moving a mobile device towards, or away from, the user causes an zoomed-in, or zoomed-out, view of a virtual object to be displayed on the screen of the mobile device.

According to another aspect of the present invention, shown in FIG. 5, the mobile device may be moved from a first position 502a to a second position 502b to zoom in, or enlarge, the object displayed 504 and 506 on the screen. In one embodiment, a gesture of moving the mobile device along an axis perpendicular to the display screen causes the virtual space displayed on the screen to zoom-in when the motion is in first direction along the axis, and to zoom out when the motion is in the other direction along the axis.

From the examples shown in FIGS. 1 through 5, a person of ordinary skill in the art will appreciate that intuitive movements or gestures, in multiple degrees of freedom, may be mapped to correspond to movements of the a data set, virtual object, and/or virtual space displayed on a screen. Additionally, the motion of the mobile device may also be mapped to correspond to any other kind of command or function, such as turning the device On or Off for instance.

An effective human-computer interface based on the movement of the mobile device may require that small movements be damped out. Otherwise, a user may become frustrated by the bouncing of the data, virtual data, and/or objects displayed resulting from every small twitches of the mobile device. The sensitivity of the interface may be tuned based on the intended application.

According to one implementation, a user may select when the intuitive motion-based interface of the present invention is active. Various means to activate and deactivate the interface may be employed. In various embodiments, a button, a thumb switch, a hand pressure switch, speech command recognition, stylus activated command, a touch screen activated command, computer vision-based facial or hand gesture recognition, and/or camera viewing of, or physical contact with, external objects may be employed for this purpose. A person of ordinary skill in the art will recognize that this is a non-exhaustive list and that other means of accomplishing this gating, or activation and deactivation, function are possible and encompassed by this invention.

In various embodiments, the gating function may be accomplished by moving the mobile device in a predetermined manner. For instance, in one embodiment, tilting the mobile device horizontally may activate gesture recognition function while tilting it vertically may deactivate gesture recognition function.

This invention may be practiced by detecting either the relative or absolute motion of the mobile device. The relative motion of the mobile device is that which is measured against a prior position of the mobile device. The absolute motion of the mobile device is that which is measured against a unique (fixed) physical location. Either a relative or absolute motion or gesture of the mobile device in real space may be translated into either a relative or absolute motion of the virtual space displayed on the mobile device as indicated below. Specifically, a relative motion in real space may be translated to a relative and/or absolute motion and/or operation of a data set. Similarly, an absolute motion in real space may be translated to a relative and/or absolute motion and/or operation of a data set.

A person of ordinary skill in these arts will recognize that many different combinations of gestures or motions may have a different effect on the data set, virtual object, or virtual environment displayed on the screen of the mobile device.

According to one embodiment, illustrated in FIGS. 2A–C and 3A–C, a user may tilt the mobile device a certain amount along a first axis to cause a data set to scroll either left, right, up, or down, until the tilt is stopped. The speed at which the data scrolls may be determined by the tilt angle relative to a neutral position.

In another implementation, a user my depress a gesture gating button and move the mobile device slightly forward to move the user from a first virtual chat room to a second virtual chat room at a constant speed. The gesture gating button may be released to stop at the second virtual chat room.

In other embodiments, mixed mode operation is also possible. For example a user may move the mobile device to an absolute position, relative to some fixed point, to view a specific location on a two-dimensional map displayed on the screen. The user may then employ relative motion, by moving the device in or out for instance, to view changes in the map location over time. Moving the device inwards or outwards may advance or retreat the view of the map location according to time.

Additionally, the present invention may be practiced along with other forms of inputs such as a touch screen or stylus. For example, in one embodiment, the user may draw a virtual figure by using a stylus to draw on the display screen while moving the mobile device in multi-dimensional space to move around the canvas. In another application, the user may move the mobile device in three-dimensional space to draw a three-dimensional virtual object with the stylus.

In another embodiment, the user may select a virtual object on the display and then move it around the virtual space by moving the mobile device in real space.

In yet another embodiment, the present invention may allow a user to operate virtual controls on a virtual control board by moving the mobile device in real space to display different parts of the control board and selecting a desired virtual control by using another form of input such as a touch screen, stylus, or voice command.

By correlating intuitive gestures or motions to certain commands, the mobile device may serve as a virtual tool with different applications. For example, the mobile device may serve as a virtual sculpting tool, such as a chisel, where the motion of the mobile device in real space may correspond to the chiseling of a virtual block of stone displayed on the mobile device's screen. The sculptor may use one or more gating switches or buttons to activate the chiseling function and/or to zoom and move around the virtual block of stone. The acceleration of the device in any particular direction may serve as an indication of force to the virtual space to remove more or less material from the virtual block of stone.

Similarly, the present invention may permit a mobile device to serve as a trowel for molding clay in virtual space. The motion of the mobile device in three-dimensional space may serve to indicate how a piece of virtual clay may be shaped. Like the sculpting tool described above, the user may also use gestures and motion to move around the virtual space and acceleration to indicate force.

Detection of the relative and/or absolute motion of the mobile device may be achieved in a number of ways. While a few methods of motion detection are disclosed herein for purposes of illustration, it should be recognized that many other means of achieving relative and absolute motion detection are available and the present invention is not limited to those means disclosed herein.

According to one embodiment, one or more accelerometer may be employed to detect movements or gestures. In one implementation, one accelerometer may be employed for each axis of movement that one desires to detect.

In one implementation, a single accelerometer mounted on a first axis to detect movement along that axis to detect relative movement, absolute acceleration, and/or absolute movement by integrating the acceleration. For instance, in FIG. 5, a single accelerometer may be mounted on the device 502 to sense motion along an axis perpendicular to the display screen to enable zooming in and zooming out the virtual space 504 and 506.

In another embodiment, a first accelerometer may be mounted on a first axis and a second accelerometer may be mounted on a second axis to detect movement along a two-dimensional plane defined by the first and second axes and/or rotation along said axes. The accelerometers may be employed to detect relative movements or gestures, absolute acceleration, or absolute movement by integrating the acceleration along the first and second axes. For instance, the mobile device illustrated in FIGS. 1A–E may comprise two accelerometers which may detect the device's motion along a plane. Thus, the view of the data set or virtual space on the device's screen may be modified based on the motion sensed by the accelerometers.

In a third embodiment, movements or gestures in three-dimensional space may be detected by employing three accelerometers, each accelerometer detecting motion on a different axis. By correlating each of the three axes to the orientation of the mobile device, the tilt, pitch, and yaw of the device may be detected. For instance, relative gestures or movements in six degrees of freedom, absolute acceleration in six degrees of freedom, and/or absolute movement in six degrees of freedom by integrating the acceleration may be detected. The mobile device shown in FIG. 4, for example, may comprise three accelerometers on three different axes to detect motion in six degrees of freedom and enable changing the view of the virtual space displayed based on the sensed motion.

Note that the accelerometers, and/or other motion sensing means, may be mounted inside the mobile device or be separate from the mobile device. That is, so long as motion information is conveyed to the display changing means, the motion or gesture detecting means may be remote from the mobile device.

Other means for detecting the motion of a mobile device include ultrasonic means and/or magnetic means to provide relative and/or absolute movement, location, and or orientation of the device. Said information may then be employed to modify or alter the view of the data set, object, or virtual space displayed on the screen of the virtual device.

In one implementation, ultrasonic means may include one ultrasonic source or clicker in combination with two ultrasonic sensors, such as microphones, to provide the relative and/or absolute location of the mobile device along two dimensions such as a plane. Similarly, one ultrasonic source in combination with three sensors may be employed to provide the relative and/or absolute location of a mobile device. Typically, the ultrasonic source provides a signal which, when received by the ultrasonic sensors, may be used to calculate the position of the mobile device.

In another embodiment, two ultrasonic sources and two sensors may be configured to provide the location plus pitch or yaw of the mobile device. Similarly, utilizing two ultrasonic sources and three sensors a mobile device's location plus pitch and yaw may be determined. Like the examples before, the signals provided by the ultrasonic sources and received by the sensors may be used to calculate the relative and/or absolute position of the mobile device. In one implementation this may be done by measuring the different time of reception by each ultrasonic sensors and using this information to determine the position of the mobile device.

In yet another embodiment, three ultrasonic sources in combination with two sensors may be configured to provide the location along a two-dimensional plane, pitch, and roll of a mobile device. Three ultrasonic sources and three sensors may also be arranged or configured to provide the three-dimensional location, pitch, yaw, and roll of a mobile device.

A magnetic dipole source may be similarly employed to provide the relative or absolute location and/or orientation of a mobile device. For instance, the combination of one magnetic dipole source and two sensors may be configured to provide the location in a two-dimensional plane and pitch or yaw of a mobile device. Three sensors and one magnetic dipole source may be configured to provide the absolute and/or relative three-dimensional location, pitch, and roll of the mobile device.

In another embodiment, two magnetic dipoles and two sensors may be configured to provide the location, along a two-dimensional plane, and the pitch and roll of a mobile device. Three sensors and two magnetic dipoles may also be configured to provide the relative and/or absolute three-dimensional location, pitch, yaw, roll of a mobile device.

The means for detecting motion, including ultrasonic clickers and magnetic dipole sources, may be configured to track the changes in two-dimensional or three-dimensional space, including locations and orientation of the mobile device, over time to provide relative movements, and/or relative or absolute accelerations. Note that with either the ultrasonic or magnetic dipole system, the sources and sensors may be configured in various ways known to those of ordinary skill in the art. For instance the sources maybe mounted on the mobile device while the sensors may be external to the device. In another embodiment, the sensors are coupled to the mobile device while the sources are external to or separate from the device.

Yet another means of obtaining the three-dimensional, six degrees of freedom, location and/or orientation of a mobile device is visual tracking using a calibrated computer vision system.

Figure 6:
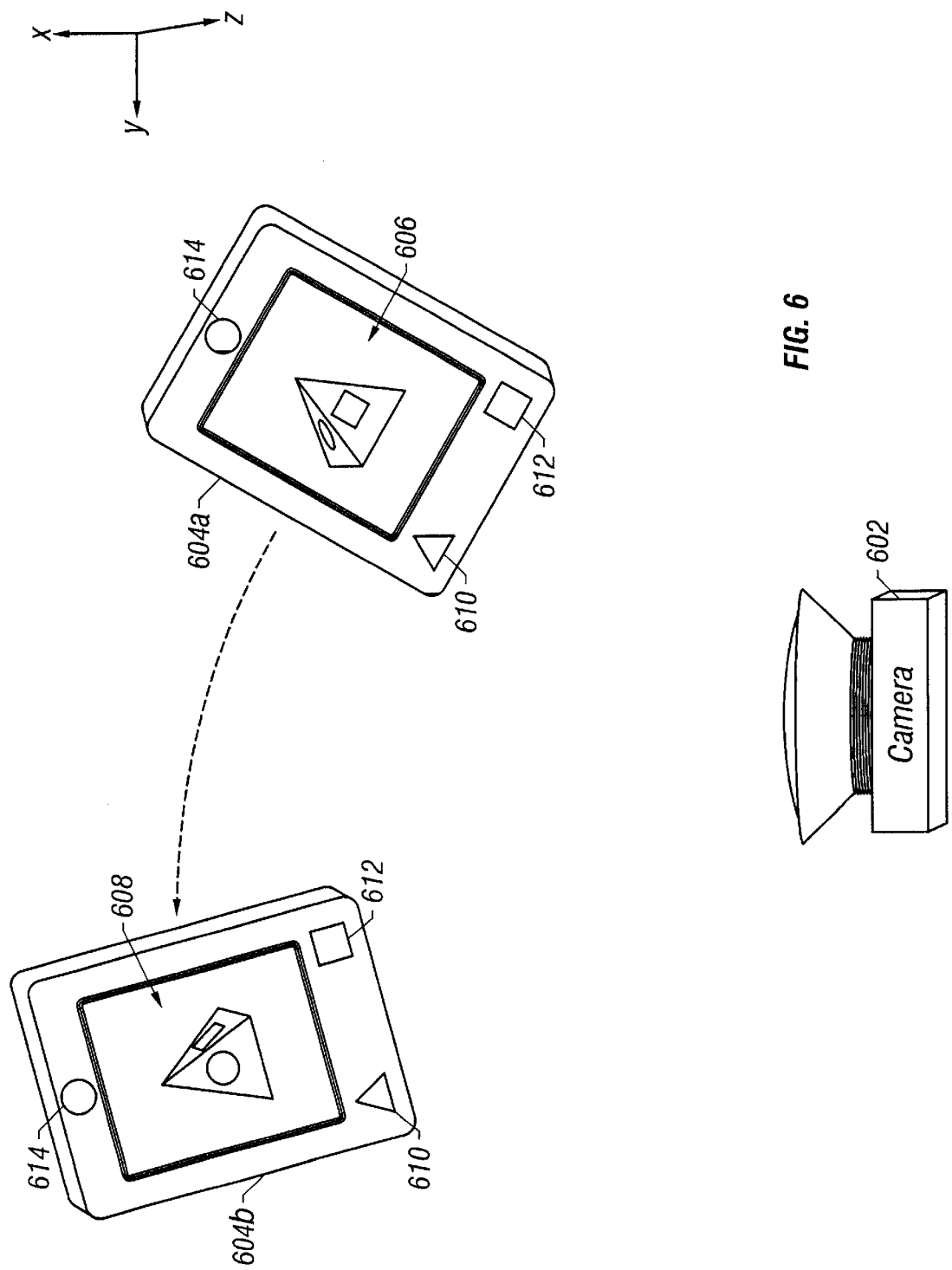
FIG. 6 illustrates one way of detecting the motion of a mobile device by means of an external camera to distinguish the mobile device's position and/or orientation.

In one implementation, illustrated in FIG. 6, one or more external cameras 602 may determine the three-dimensional location and orientation of a mobile device 604a and 604b based on three or more markings 610, 612, and 614 on the mobile device 604a and 604b. The camera(s) 602 may provide images of the mobile device including said markings. The images may then be processed, by identifying said markings to provide the relative and/or absolute location and orientation of the mobile device. Using said information, the mobile device may be capable of displaying different views of the virtual space or object. For instance, in FIG. 6, moving the mobile device from a first position 604a to a second position 604b may cause the virtual space to change from a first view 606 to second view 608. In one implementation, the second view of the virtual space or object may correspond to the view as seen by an observer who moves from the first position to the second position.

Figure 7:
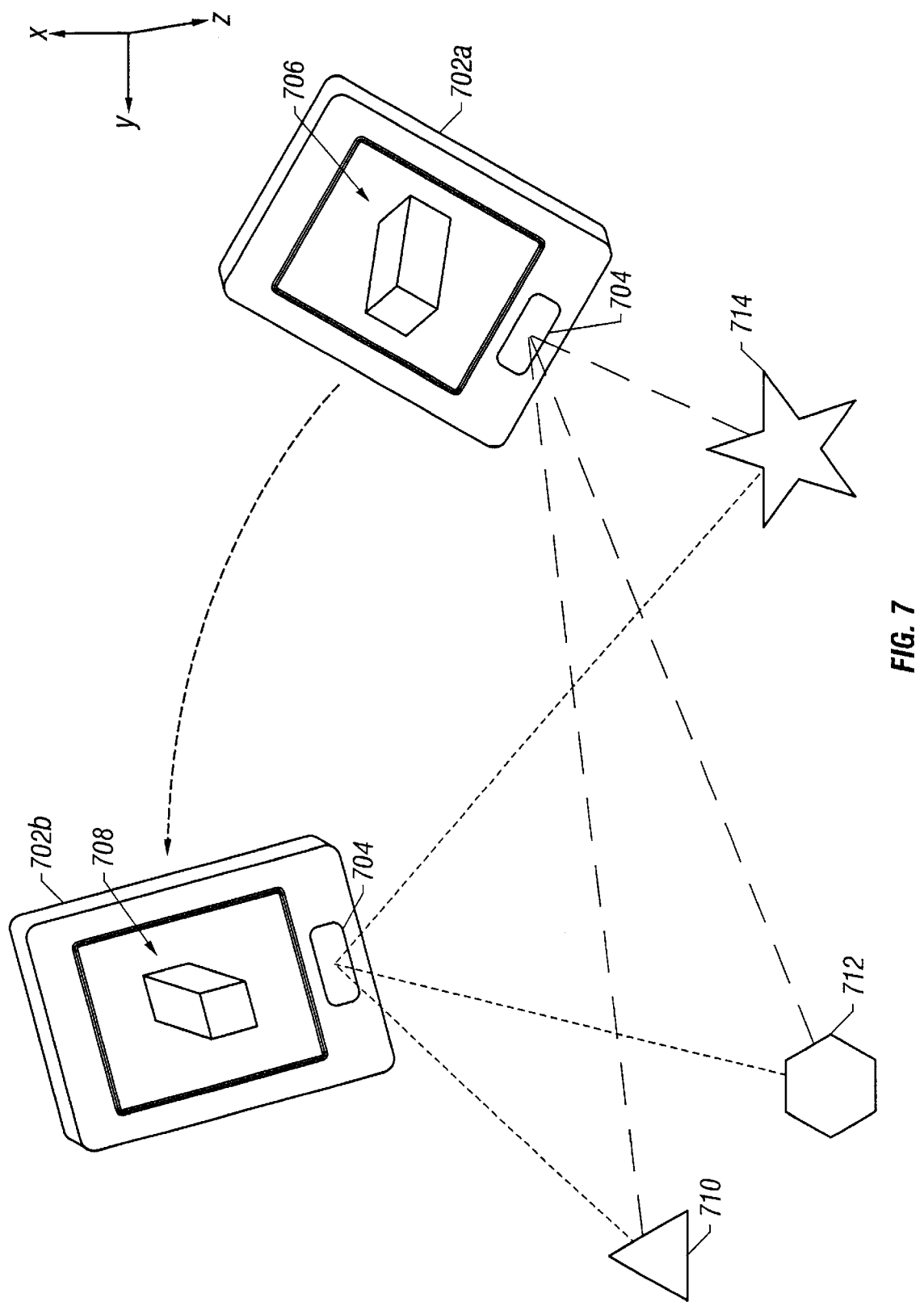
FIG. 7 illustrates one way of detecting the motion and/or position of a mobile device by means of a camera on the mobile device to recognize a plurality of external reference points.

According to a second implementation, illustrated in FIG. 7, the mobile device 702 may include a camera 704 which, by detecting the location of external reference points 710, 712, and 714, may be used to determine the absolute or relative location and orientation of the mobile device 704. Thus, the mobile device may display a first view 706 when it is at a first spatial position 702a and a second view 708 when it is at a second spatial position 702b. In one embodiment, the relative motion of the device may be determined by optical flow methods, identifying the change in visually perceived objects for instance. In another embodiment, the absolute motion may be determined from the structure of known, visually perceived, reference objects.

While a few position, gestures, and motion detection means have been described, many other means, including infra-red emitter detectors and global positioning systems, may be employed without deviating from the present invention.

In one embodiment of the invention, the motion detection means and mobile device must be within 1 mile of each other. In a second embodiment, the motion detection system and the mobile device must be within 100 feet of each other. In a third embodiment, the motion detection system must be physically coupled to the mobile device.

Additionally, all or part of this invention may be practiced by hardware components, programmable devices, software, and/or integrated circuits.

While the invention has been described and illustrated in detail, it is to be clearly understood that this is intended by way of illustration and example only and is not to be taken by way of limitation, the spirit and scope of this invention being limited only by the terms of the following claims.

What is claimed is:

1. A method comprising:
   detecting the absolute motion of a mobile device in multi-dimensional space; measuring the time of the motion; and
   modifying a display of the mobile device based on the detected motion of the mobile device.

2. The method of claim 1 wherein detecting the motion of the mobile device includes detecting the motion in one or more spatial dimensions.

3. The method of claim 1 wherein modifying the display is based on a predetermined relationship between the motion and one or more display altering commands.

4. The method of claim 1 further comprising:
   correlating the motion of the mobile device to one or more commands.

5. The method of claim 4 wherein the one or more commands include display altering instructions.

6. The method of claim 1 wherein tilting the mobile device along its long axis causes a displayed document to scroll until the tilt is stopped.

7. The method of claim 1 wherein moving the mobile device along an axis perpendicular to the display screen causes the displayed data to zoom in if the motion is in a first direction and zoom out if the motion is in a second direction.

8. The method of claim 1 wherein moving the mobile device from a first position in space to a second position in space causes the view of a displayed object to change from a first position to a second position.

9. The method of claim 1 wherein the absolute gesture-based motion of the mobile device is detected.

10. The method of claim 1 wherein detecting the absolute motion further comprises placing multiple reference markers on the mobile device and optically detecting the multiple reference markers with an apparatus separate from the mobile device when the mobile device is at first position and at a second position thereby determining the mobile device's motion.

11. A device comprising:
a processing unit to receive input signals and generate output signals;
a display screen, coupled to the processing unit, to display information according to signals received from the processing unit; and
a motion detection system communicatively coupled to the processing unit, to detect the absolute motion of the device in multi-dimensional space, to measure the time of the motion, and to provide corresponding signals to the processing unit.

12. The device of claim 11 wherein the processing unit receives input signals from the motion detection system and generates display altering output signals corresponding to the input signals from the motion detection system.

13. The device of claim 11 wherein what is displayed on the display screen changes according to a predetermined relationship between the motion of the device and the corresponding effect on the view of what is displayed on the screen.

14. The device of claim 11 wherein the motion detection system detects the gesture-based motion of the mobile device.

15. The device of claim 11 wherein the motion detection system includes one or more accelerometers configured to detect the motion of the device in one or more spatial dimensions.

16. The device of claim 11 wherein the motion detection system includes one or more ultrasonic sensors configured to detect the motion of the device in one or more spatial dimensions.

17. The device of claim 11 wherein the motion detection system includes one or more magnetic sensors configured to detect the motion of the device in one or more spatial dimensions.

18. The device of claim 11 wherein the motion detection system includes an optical detection apparatus coupled to the device to detect multiple external references from a first position and from a second position to determine the device's motion.

19. The device of claim 11 wherein the motion detection system is physically detached from a mobile device that includes the display screen.

20. The device of claim 11 wherein the motion detection system includes multiple reference markers on the device and an optical detection apparatus separate from the device to detect the multiple reference markers when the device is at a first position and at a second position thereby determining the device's motion.

21. The device of claim 11 wherein a displayed document on the display screen scrolls when the mobile device is tilted along its long axis and continues scrolling until the tilt is stopped.

22. The device of claim 11 wherein displayed data on the display screen zooms in if the motion of the mobile device is in a first direction along an axis perpendicular to the display screen and zooms out if the motion is in a second direction along an axis perpendicular to the display screen.

23. A system comprising:
means for detecting the absolute motion of a mobile device in multi-dimensional space;
means for measuring the time of the motion; and
means for modifying what is displayed on a display screen of the mobile device based on the detected motion of the mobile device.

24. The system of claim 23 further comprising means for correlating the motion of the mobile device to one or more display altering instructions.

25. The system of claim 23 wherein what is displayed on the display screen changes according to a predetermined relationship between the motion of the mobile device and corresponding effect on the view of what is displayed on the screen.

26. The system of claim 23 wherein the means for modifying what is displayed causes a displayed document to scroll when the mobile device is tilted along its long axis until the tilt is stopped.

27. The system of claim 23 wherein the means for modifying what is displayed causes displayed data to zoom in if the motion is in a first direction along an axis perpendicular to the display screen and zoom out if the motion is in a second direction along an axis perpendicular to the display screen.

28. The system of claim 23 wherein the means for detecting the absolute motion further comprises means for optically detecting multiple reference markers on the device when the device is at a first position and at a second position thereby determining the device's motion, wherein the means for optically detecting is separate from the device.

29. A machine-readable medium comprising at least one instruction to correlate motion in real space to motion in virtual space, which when executed by a processor, causes the processor to perform operations comprising:
detecting the absolute motion of a mobile device in multi-dimensional space;
measuring the time of the motion; and
correlating the motion of the mobile device to a one or more display altering commands.

30. The machine-readable medium as recited by claim 29 further comprising:
modifying the display of the mobile device based on the one or more display altering commands.

31. The machine-readable medium as recited by claim 29 wherein detecting the motion of a mobile device includes detecting gesture-based motions of the mobile device.

32. The machine-readable medium as recited by claim 29 wherein tilting the mobile device along its long axis causes a displayed document to scroll until the tilt is stopped.

33. The machine-readable medium as recited by claim 29 wherein moving the mobile device along an axis perpendicular to a display screen causes the displayed data to zoom in if the motion is in a first direction and zoom out if the motion is in a second direction.

* * * * *